Aug. 19, 1969  R. R. SYLVESTER  3,461,599
TACKLE CHEST
Filed March 8, 1967
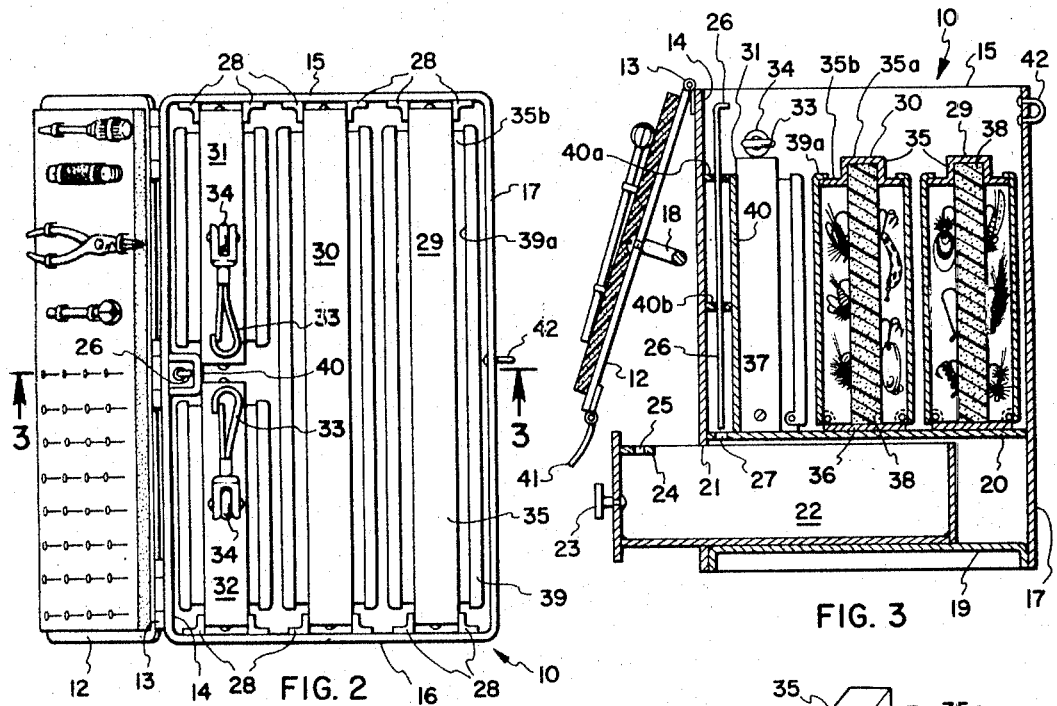
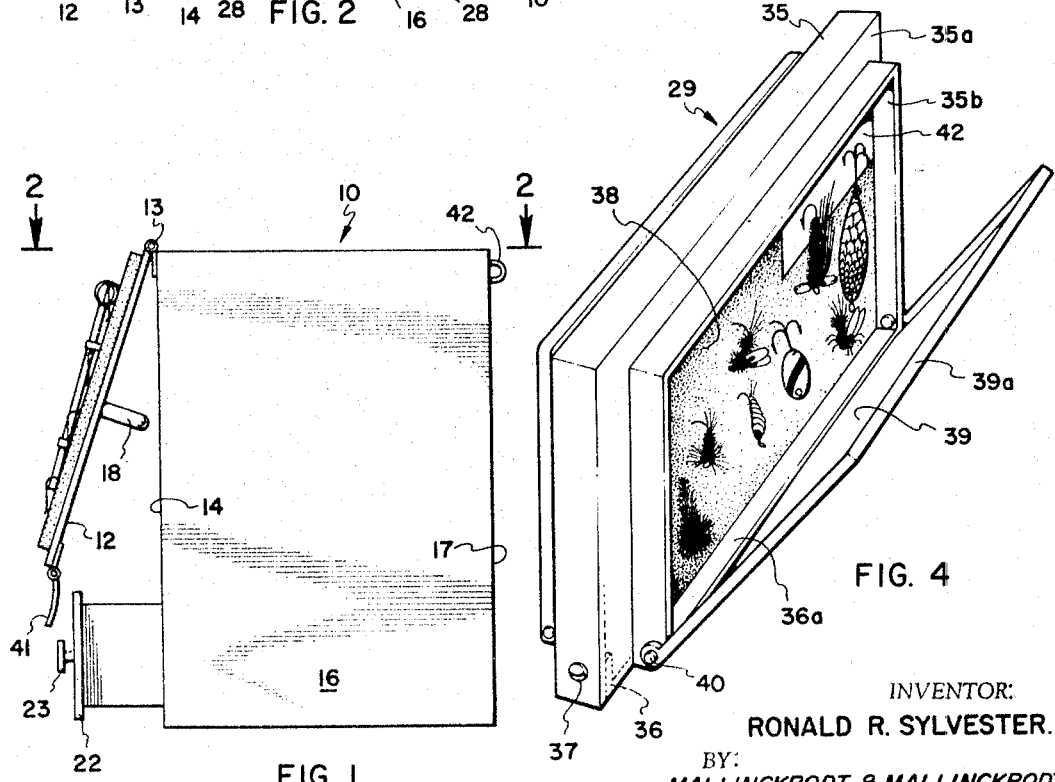
INVENTOR:
RONALD R. SYLVESTER.
BY:
MALLINCKRODT & MALLINCKRODT
ATTORNEYS.

United States Patent Office 3,461,599
Patented Aug. 19, 1969

3,461,599
TACKLE CHEST
Ronald R. Sylvester, 902 East 12650 South,
Draper, Utah 84020
Filed Mar. 8, 1967, Ser. No. 621,597
Int. Cl. A01k 97/06, 97/00
U.S. Cl. 43—57.5                                  2 Claims

ABSTRACT OF THE DISCLOSURE

A chest for use by fishermen and the like comprising a large box for receiving individual storage compartments, and a drawer, and locking means to prevent inadvertent withdrawal of the storage compartments and drawer. The individual storage compartments provide easily accessible, broad faces to which lures and the like can be attached and smaller compartments are provided with means for attaching them to a fisherman's belt.

BRIEF SUMMARY

The present invention relates to tackle chests for use by fishermen and the like and is particularly useful in boats.

In the past there have been a great many chests developed for use in holding fishing tackle and accessories. In using most of these, however, hooks, flies, lures, etc., are simply thrown into drawers or cubicles where they become so tangled that it is difficult to separate them. In reaching into the drawers to extricate the hooks, flies, and lures and in trying to separate them after they become entangled, the fisherman frequently sticks a point into a finger.

It is an object of the present invention to provide a tackle chest having compartments for various kinds and sizes of hooks, flies and lures, with the compartments being individually removable and each including at least two broad faces to which the hooks, flies and/or lures are individually attached in such a manner that they cannot become entangled.

Tools, such as pliers, awl, clippers, etc., are also frequently necessary and accessories such a extra tackle, cork, reels, and pare parts are often deired. Thus, it is also an object of the present invention to provide a tackle chest that will display those tools most frequently used for quick easy accessibility, while securely holding them in place when not in use, and that includes a storage area for extra line, reels, spare parts and other miscellaneous items a fisherman may desire to have readily available.

While in a boat or in areas accessible by vehicle a fisherman may want a large assortment of hooks, flies, lures and other accessories handy, but when he walks to an otherwise inaccessible area, rather than carrying a lot of excess weight and bulk, he normally is satisfied with a smaller assortment of hooks, flie, lures, and similar articles.

Accordingly, it is another object of the invention to provide a chest that will hold a large assortment of equipment and accessories and in which hooks, flies, lures, etc., are maintained in separate, self-contained, smaller compartments, at least one of which is adapted to be fastened to the belt of a fisherman.

Outstanding features of the invention include a large box having guides therein to receive a number of smaller, self-contained compartments. A pivoted lid on the box, when closed, holds the self-contained compartments in the box and also holds a locking mechanism that prevents a drawer beneath the compartments from opening inadvertently. When the lid is pivoted to its open position the compartments are easily individually removed, the locking mechanism can be operated to release the drawer and the drawer can be easily pulled open.

The compartments each include broad faces on which hooks, flies, lures, etc., are adapted to be individually attached, a frame surrounding the faces, and pivoted walls that cooperate with the frame to enclose the broad faces.

THE DRAWING

In the drawing:

FIG. 1 is a side elevation view of the chest of the invention, with the lid open;

FIG. 2, a top plan view;

FIG. 3, a vertical section taken on the line 3—3 of FIG. 2; and

FIG. 4, an enlarged, perspective view of a self-contained container adapted to fit within the box of the chest.

DETAILED DESCRIPTION

Referring now to the drawing:

In the illustrated preferred embodiment, the tackle chest includes a large box shown generally at 10 and a cover 12, pivotally connected by a hinge 13 to the top of front wall 14 of the box. The cover is swingable between a closed position resting on top of the walls 14–17 of the box and an open position wherein a carrying handle 18 abuts the exterior of wall 14.

A bottom plate 19 closes the lower end of the box 10 and a false bottom 20 is positioned above and parallel to bottom plate 19.

Front wall 14 is cut away between the bottom plate 19 and the false bottom 20 to provide an opening 21 through which a drawer 22 is inserted. A knob 23 on the face of the drawer is easily gripped to move the drawer in or out of the box 10.

A lip 24 projects from the face of the drawer, inwardly and a hole 25 is provided downwardly through the lip to receive the end of a locking rod 26 that is inserted downwardly through a hole 27 in false bottom 20, in a manner to be more fully explained.

Pairs of spaced angles 28 are vertically fixed to the inside of side walls 15 and 16 in back to back relationship so as to form opposing guide channels for removable compartments 29–32.

The compartment 29 is shown in FIG. 4, and compartment 30 is identical therewith. Compartments 31 and 32 are similar in construction, but, as shown in the drawing, they are smaller in size and have catches 33 mounted by swivels 34 to the tops thereof.

Each of the compartments 29–32 includes a border frame FIG. 4, preferably made of a single strip 35 of hat-shaped material, bent to form three sides of a rectangle and strip 36 of flat material having upturned ends held connected to strip 35 by screws 37 that are passed through the ends of the strips. Obviously, if desired, other means can be used to secure the border together, and the border can be made of a single strip of material or more than two strips can be joined together. It is necessary, however, that the border can be disconnected to allow replacement of a wall 38 that fits within the center channel 35a formed by the hat-shaped border and that is adapted to receive and hold the barbed ends of hooks, flies, lures, etc. Wall 38, can be of any inexpensive, suitable material, but foamed plastics such as urethane and polyethylene have been found ideally suited. As the barbed ends are removed portions of the wall will be pulled free and eventually the wall must be replaced. This, however, is readily done, simply by removing the screws 37 and the strip 36 and sliding the wall from the hat-shaped section.

The flanges 35b of the hat-shaped section 35 and lateral extensions 36a of the flat section 36 form frames that project outwardly from the wall 38 a distance sufficient to allow articles on the wall to hang freely. Doors 39, having an inturned edge 39a around three sides thereof, are pivotally connected by pins 40 to the bottom corners of the flanges 35b and are pivotable between an open position affording ready access to wall 36 and a closed position wherein the frictional engagement of the inturned edge 39a with flange 35b holds the door closed.

In use, the tackle chest of the invention is closed while being transported and for storage purposes. At this time the compartments 29 and 30 are slid downwardly into guide channels formed by special angles 28 and compartments 31 and 32 are placed in aligned, side-by-side relationship, with one side of the hat-shaped section of each compartment slid downwardly into a channel formed by spaced angles 38 and the opposite side of the hat-shaped section guided by a vertical partition 40 that has a top 40a and a spacer 40b through which the locking rod 26 extends.

Drawer 22 is pushed into the chest while rod 26 is held in a raised position. After the drawer is in its closed position the rod is lowered into hole 25 of lip 24 and the drawer is securely held against withdrawal.

Cover 12 is pivoted to its closed position and hasp 41 thereon is passed over staple 42 to secure the cover. A padlock or other locking device can be passed through the staple to even more securely hold the hasp. When the cover is closed compartments 29-32 cannot be withdrawn from the chest, rod 26 cannot be withdrawn from hole 25, and drawer 22 cannot be opened.

After the cover has been opened, the tools and items fastened to the inside cover are readily accessible, one or more of the compartments 29-32 can be withdrawn for easy selection of hooks, flies, lures, etc. contained therein and rod 26 can be raised to allow drawer 24 to be opened.

A fisherman desiring to carry only a limited selection of hooks, flies and lures, can easily fasten one or both of the compartments 31 or 32 to his belt with the catch 33 provided for the purpose. It is not necessary that he transport the entire chest everywhere he goes. Thus, this arrangement is most useful where a fisherman desires to leave the larger tackle chest in his vehicle or boat and to walk to a relatively inaccessible area.

While wall 36 has been disclosed as being of penetrable material, a portion 42 of the wall can be a magnet, or if desired, the entire wall can be of magnetized material. As illustrated portion 42 is imbedded in wall 36. The magnetized material attracts and hold the metal positions of the hooks, flies, lures, etc., individually and displayed for easy removal.

I claim:
1. A tackle chest for use by fishermen comprising:
a box having an open top;
a lid pivotally connected to the box and adapted to close the open top;
vertical guide means providing channels in said box;
a plurality of enclosed compartment means slidable in said channels into and out of said box, said compartment means each including:
   a broad wall of material having opposite faces adapted to hold articles of fishing equipment thereon;
   a peripheral frame means provided with a channel and outwardly directed flanges, said channel slidably receiving the wall and the frame means being adapted to be guided within the vertical guide means in the box;
   means for releasably holding the wall within the peripheral frame, whereby the wall can be easily replaced; and
   doors hingedly connected to the flanges of the frame and adapted to cooperate with the frame to cover equipment secured to the faces and to provide easy access thereto.
2. A tackle chest as in claim 1, wherein:
at least one of the compartments has a snap-on hook means thereon, whereby the compartment can be removed from the box and can be readily snapped on to a user's belt, said hook means being arranged to rest on the compartment when the compartment is in the box, such that the lid can be moved to close the top of the box.

References Cited

UNITED STATES PATENTS

| | | | |
|---|---|---|---|
| 1,577,566 | 3/1926 | Cryder | 43—57.5 |
| 2,711,050 | 6/1955 | McIntyre | 43—57.5 |
| 2,999,621 | 9/1961 | Kiser | 43—57.5 X |
| 3,182,872 | 5/1965 | Brosseau | 43—57.5 X |
| 3,310,905 | 3/1967 | Davis et al. | 43—57.5 |
| 3,350,810 | 11/1967 | Warner et al. | 43—57.5 |

HUGH R. CHAMBLEE, Primary Examiner